ns Patent [19]
Boncoeur et al.

[11] 3,712,736
[45] Jan. 23, 1973

[54] METHOD AND DEVICE FOR TESTING WELDS BY OPTICAL SPECTROGRAPHY

[75] Inventors: Marcel Boncoeur, Louis Heintz, Antony; Jean Langrand, Palaiseau; Michel Lavaud, Ris-Orangis, all of France

[73] Assignee: Commissariat A L'Energie Atomique, Paris, France

[22] Filed: Jan. 5, 1971

[21] Appl. No.: 103,993

[52] U.S. Cl. .................. 356/74, 219/121 R, 356/36, 356/85
[51] Int. Cl. ............................. G01j 3/00, G01n 1/00
[58] Field of Search .......... 356/36, 51, 74, 79, 85, 86, 356/87, 96; 219/121 R

[56] References Cited

UNITED STATES PATENTS 3,271,558   9/1966   Davis ..................................... 359/96

Primary Examiner—Ronald L. Wibert
Assistant Examiner—V. P. McGraw
Attorney—Cameron, Kerkam & Sutton

[57] ABSTRACT

A method of testing welded work pieces by optical spectrography (either emission or atomic absorption) comprises locating a wire or film of tracer material which diffuses within the work piece material when in the liquid state, at the minimum depth to be attained by the weld and on the welding path. The presence of said tracer in the plasma above the welding zone is continuously detected during the welding operation by spectrography. A wire or film of a second material may be located at a deeper location which should not be attained.

8 Claims, 5 Drawing Figures

METHOD AND DEVICE FOR TESTING WELDS BY OPTICAL SPECTROGRAPHY

The invention relates to methods and devices for testing welds and is primarily concerned with inspection of welds performed by the electron beam process, although other applications may also be contemplated.

It is often essential to make sure that a weld seam which is formed on a part attains a predetermined depth along the entire welding path. It may also prove necessary to check whether the depth of the weld seam remains smaller than a given value. Methods which are at present in use for testing welds make it possible to carry out a test only on completion of the weld, that is to say too late to permit easy remedial work on the defective portion. Furthermore, the usual means of weld testing (X-ray, gammagraphy, ultrasonic testing, eddy-current testing) require a highly skilled operator for detecting flaws and particularly insufficient weld penetration.

A primary object of the invention is to provide a method and device for testing welds which meet practical requirements more effectively than those employed in the prior art, especially insofar as indications in regard to the depth of penetration of the weld at each point are given practically at the same time as the weld joint is being formed.

Accordingly, the invention proposes a method of weld testing of parts by optical spectrography on the principle of either emission or atomic absorption, wherein a wire or film of tracer material which diffuses within the material constituting the part when said material is in the liquid state is placed prior to welding at the minimum depth to be attained by the weld and on the welding path and wherein the presence of said tracer in the plasma above the welding zone is continuously detected during the welding operation by means of a spectrographic technique.

The advantages of the method over prior methods of nondestructive testing will be readily apparent : a locally defective weld can immediately be remedied during the same welding operation. It is possible to proceed even further and to provide for an automatic welding operation by controlling the operating parameters which determine the penetration on the basis of the results supplied by means of the method according to the invention. Moreover, the method is sensitive and economical since the operation which it represents is not carried out after welding but at the same time.

A clearer understanding of the invention will be gained from the following description in which embodiments of the invention are given by way of non-limitative example, reference being made to the accompanying drawings, in which :

FIG. 1 is a very diagrammatic sectional view taken through the junction between two metal components to be joined together by welding in order to form a part ;

FIG. 2 can be regarded as a sectional view taken along line II—II of FIG. 1 and showing diagrammatically the mode of progression of the welding and testing operation ;

Figure 4:
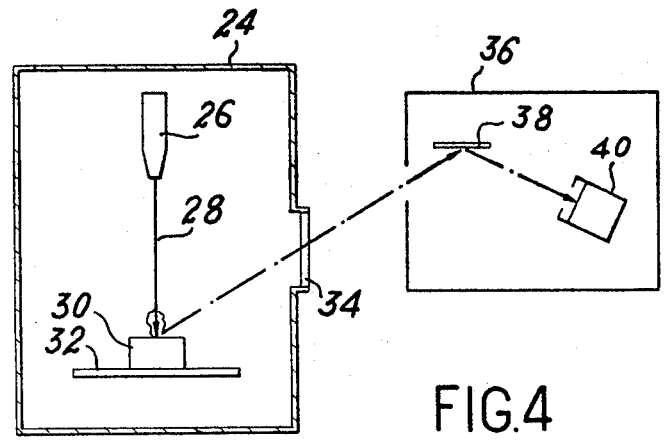
FIG. 4 is a highly simplified diagram showing a testing device in accordance with the invention which makes use of an emission spectrograph.
Figure 5:
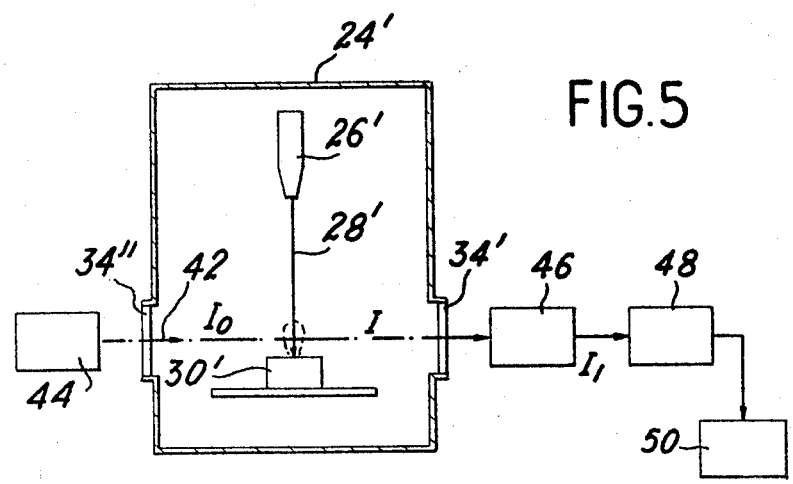

FIG. 5 which is similar to FIG. 4 shows a testing device which makes use of an absorption spectrograph.

Figure 1:
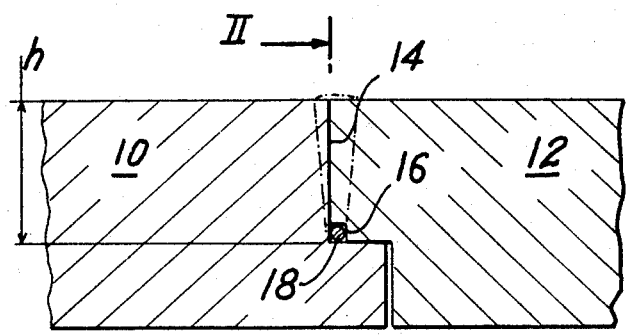

FIG. 1 shows very diagrammatically two components 10 and 12 to be joined together by means of an end weld along their contacting face 14. This weld joint is formed by means of the electron beam process and must attain a minimum depth $h$. In accordance with the invention, a wire 18 of tracer material having a diameter of a few hundredths of a millimeter is placed within a groove 16 which is formed for this purpose in the component 12. Said tracer material (which is usually metal) is chosen so as to diffuse rapidly and completely throughout the material which constitutes the parts 10 and 12 when said material is brought to the liquid state and in order not to impair the mechanical or chemical properties to such an extent that the weld is no longer satisfactory.

It is possible in particular to make use of Mo, Ti, Cu as tracer material in the event that the base metal of the part is uranium and to make use of Cu, Zr, Al in the event that the base metal is magnesium.

Figure 2:
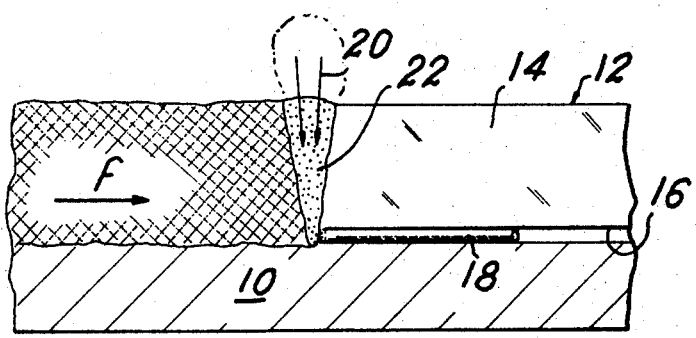

The testing operation is then carried out as shown diagrammatically in FIG. 2. Thus, when the electron beam 20 falls on the components 10 and 12 of the part, the constituent material of the part (usually a metal or alloy) melts locally. A pocket 22 of molten metal is accordingly formed. If this molten zone is of sufficient depth, that portion of the tracer wire 18 which is placed opposite to the pocket melts, is diluted in said pocket and appears in vapor phase above the liquid metal within the plasma. The presence of the tracer is detected by spectrography.

It is immediately apparent that, if the depth of the molten zone is insufficient in a weld zone, the tracer wire does not melt and no trace of the element is detected by spectrography : the indication thus obtained is evidently practically instantaneous.

Figure 3:
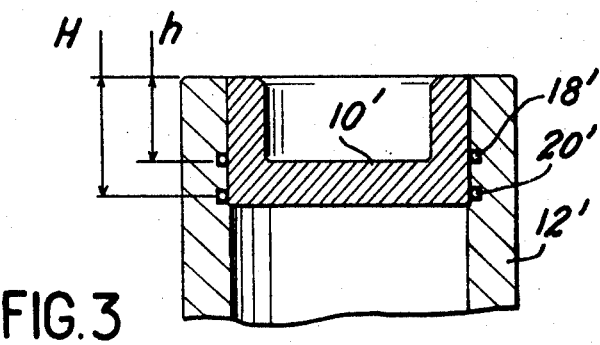
FIG. 3 shows very diagrammatically two components to be joined together by means of a weld seam which is intended to have a minimum depth $h$ and must not exceed a maximum depth $H$.

FIG. 3, which is similar to FIG. 1, shows the application of the invention to the case in which the depth of weld must be between a minimum value $h$ and a maximum value $H$. The two components of the part to be welded are in one case the can 12' and in the other case the end-cap 10' of a nuclear fuel element. There is then placed at a depth $h$ a wire 18' of a first tracer, the presence of which is intended to be continuously detected as the welding operation is being performed, and at a depth $H$ a wire 20' of a different tracer which is placed within a groove of the can 12' and the presence of which must not on any account be detected.

FIGS. 4 and 5 show devices for carrying out the invention by making use respectively of emission optical spectrography and atomic absorption spectrography as a detection method.

FIG. 4 shows a welding enclosure 24 fitted with means (not shown) for evacuating said enclosure. An electron gun 26 which produces a beam 28 is stationarily mounted within said enclosure. The part 30 to be welded is placed on a table 32 fitted with means (not shown) for subjecting said part to movements in plan which are necessary to bring successively all the points of the weld joint to be formed opposite to the beam 28. The welding location therefore remains fixed in space.

Impingement of the electron beam on the part is accompanied by production of radiations in the ultraviolet and visible region of the spectrum among others. The enclosure 24 is fitted with a window 34 formed of material which is transparent to the radiation employed and a light beam which emanates from the impingement zone is allowed to pass through said window. Said light beam falls on the entrance diaphragm of an optical spectrograph 36 comprising an analyzer system 38 (grating, prism, Fabry-Perot etalon, etc. . . . ) which isolates a characteristic line of the tracer and a photomultiplier tube 40 to which said line is applied. Said photomultiplier which is connected to a measuring instrument then delivers a signal whose intensity is proportional to the concentration of the tracer in the form of excited atoms in the plasma which is located above the weld zone.

The photomultiplier 40 must evidently receive only the light which is produced by the tracer element and not the light emanating from the spectrum of the constituent metals of the part which are also excited. In the case of metals having a highly complex spectrum (which is especially the case of uranium), a high-resolution spectrograph is necessary.

In the mode of operation which is illustrated in FIG. 5, the presence of the tracer is detected by atomic absorption spectrography. This approach is based on the fact that the variations in concentration of a tracer element in a discharge can be followed if a sufficient quantity of atoms of said tracer element is present therein in the state of atoms : in the device of FIG. 5, there is again shown a welding enclosure 24' and an electron gun 26' which delivers an electron beam 28'. The gun 26' is stationary and the part 30' to be welded passes in front of said gun. The enclosure 24' has two aligned quartz windows 34' and 34", said windows being placed in locations such that a light beam 42 which is admitted through the window 34" and emerges through the window 34' passes immediately above the weld zone and therefore through the vaporized metal plasma which is present therein. The light beam 42 is produced by a lamp which emits the characteristic lines of the tracer : it is possible in particular to employ a hollow-cathode lamp 44 which is formed of the same material as that of the tracer wire. The light beam which has an intensity $I_0$ before passing through the plasma than has only a low intensity I after passing therethrough if atoms of tracer metal are present in the discharge. The light beam which emerges from the window 34' is filtered by a monochromator 46 so that radiations having a wavelength which is different from that absorbed by the tracer are accordingly eliminated. The light beam then falls on a photomultiplier 48 which is connected to an instrument 50 for measuring the current delivered. The intensity of light received by the photomultiplier 48 assumes a value $I_1$ which is close to $I_0$ or a value $I_2$ which is distinctly lower, depending on whether atoms of the tracer metal are absent from the plasma or appear therein : it is thus possible to detect a localized insufficiency of penetration practically instantaneously.

The use of atomic absorption spectrography (embodiment of FIG. 5) carries the advantage of higher sensitivity compared with emission spectrography and entails a lesser degree of practical difficulty, the apparatus being also lower in cost and smaller in overall size. On the other hand, should it be desired to detect not only insufficiency of weld penetration (depth of weld which does not attain the value $h$ in the case of FIG. 3) but also excessive penetration (depth H in FIG. 3) it is apparent that, in the case of emission spectrography, it is only necessary to provide an additional photomultiplier. On the contrary, in the case of atomic absorption spectrography, it is necessary to provide two light beams produced by two hollow-cathode lamps of different types and corresponding to the two tracers employed, each lamp being associated with a chain consisting of monochromator, photomultiplier and measuring instrument.

The field of application of the invention is clearly not limited to electron beam welding and the method is applicable in a vacuum, in a controlled atmosphere and in free air for plasma welding, arc welding and the like.

We claim :

1. A method of testing welds on work pieces by optical spectrography, comprising the steps of : locating an elongated member of a tracer material at a predetermined depth to be attained by the weld and on the welding path, said tracer material being of a type which diffuses in the work piece material when the latter is liquid ; and continuously monitoring the plasma above the weld zone by optical spectrography during the welding operation for detecting the presence of the tracer material in said plasma.

2. A method of testing as defined in claim 1, including the step of placing an elongated member of a second tracer having an emission or absorption spectrum which is different from the first tracer material prior to welding at a depth which must not be attained by the weld.

3. A method as defined in claim 1, including the step of welding the work piece by an electron-beam in an evacuated enclosure.

4. A method as defined in claim 1, including the step of directing the light emitted by said plasma to an optical spectrograph through a window in an enclosure containing said part and monitoring an emission line of said tracer material by said spectrograph.

5. A method as defined in claim 1, including the step of passing light from a source outside an enclosure containing the work piece through said plasma and to a spectrograph and monitoring an absorption line of said tracer material by said spectrograph.

6. A method as defined in claim 5, wherein said light has the same characteristic lines as the tracer.

7. A method as defined in claim 1, wherein the work piece material is uranium and the tracer material is selected from the group consisting of Mo, Ti and Cu.

8. A method as defined in claim 1, wherein the work piece material is magnesium and the tracer material is selected from the group consisting of Cu, Zr and Al.

* * * * *